US006632508B1

(12) United States Patent
Pellerite et al.

(10) Patent No.: US 6,632,508 B1
(45) Date of Patent: Oct. 14, 2003

(54) OPTICAL ELEMENTS COMPRISING A POLYFLUOROPOLYETHER SURFACE TREATMENT

(75) Inventors: Mark J. Pellerite, Woodbury, MN (US); Susannah C. Clear, Cottage Grove, MN (US); Cheryl L. S. Elsbernd, Woodbury, MN (US); Richard M. Flynn, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 306 days.

(21) Appl. No.: 09/698,434

(22) Filed: Oct. 27, 2000

(51) Int. Cl.$^7$ .............................. B32B 1/00; B32B 5/16; C08K 9/04; G03B 21/60
(52) U.S. Cl. .................. 428/142; 428/144; 428/422; 428/403; 428/406; 428/323; 428/325; 428/327; 359/453; 523/200
(58) Field of Search ................. 428/142, 144, 428/421, 422, 403, 404, 405, 406, 407, 323, 325, 327, 331, 141, 313.3, 313.5, 313.7, 313.9; 359/453; 523/200

(56) References Cited

U.S. PATENT DOCUMENTS

| | | | |
|---|---|---|---|
| 2,567,011 A | 9/1951 | Diesslin et al. ............. 560/227 |
| 2,606,206 A | 8/1952 | Guenthner ................. 562/596 |
| 2,642,416 A | 6/1953 | Ahlbrecht et al. .......... 526/245 |
| 2,662,835 A | 12/1953 | Reid ....................... 428/422 |
| 2,666,797 A | 1/1954 | Husted et al. .............. 568/842 |
| 2,693,458 A | 11/1954 | Olson ...................... 528/271 |
| 2,706,733 A | 4/1955 | Reid ....................... 560/356 |
| 2,727,923 A | 12/1955 | Husted ..................... 564/291 |
| 2,732,398 A | 1/1956 | Brice et al. ................. 562/30 |
| 2,759,019 A | 8/1956 | Brown et al. ................ 564/96 |
| 2,764,602 A | 9/1956 | Ahlbrecht ................... 554/52 |
| 2,803,615 A | 8/1957 | Ahlbrecht ................... 564/96 |
| 2,803,656 A | 8/1957 | Ahlbrecht .................. 524/805 |
| 2,809,990 A | 10/1957 | Brown ...................... 562/556 |
| 2,841,573 A | 7/1958 | Ahlbrecht .................. 526/245 |
| 2,934,450 A | 4/1960 | Brown ................... 106/287.18 |
| 3,222,204 A | 12/1965 | Weber et al. ............. 427/163.4 |
| 3,666,530 A | 5/1972 | Aue et al. .................. 428/429 |
| 3,922,381 A | 11/1975 | Datta ........................ 427/21 |
| 4,713,295 A | 12/1987 | Laroche .................... 428/406 |
| 5,128,203 A | 7/1992 | LaRoche .................... 428/325 |
| 6,153,671 A | 11/2000 | Schleifstein ................ 523/217 |
| 2002/0090515 A1 * | 7/2002 | Pellerite et al. ............. 428/406 |

FOREIGN PATENT DOCUMENTS

EP 0 433 070 6/1991
WO WO 99/37720 7/1999

OTHER PUBLICATIONS

Product Information: "Krytox®157 FS Fluorinated Oil," Du Pont, Sep. 29, 2000.

* cited by examiner

Primary Examiner—Ramsey Zacharia
(74) Attorney, Agent, or Firm—Carolyn A. Fischer

(57) ABSTRACT

The present invention relates to optical elements comprising fluorochemical surface treatments. The invention further relates to materials such as retroreflective sheetings, pavement markings and beaded projection screens comprising a binder and the surface treated optical elements. The fluorochemical surface treatment is substantially free of perfluoroalkyl groups having more than four carbon atoms. Preferably, the surface treatment is a polyfluoropolyether-based compound comprising at least one polar group or polar group-containing organic radical.

18 Claims, No Drawings

OPTICAL ELEMENTS COMPRISING A POLYFLUOROPOLYETHER SURFACE TREATMENT

FIELD OF THE INVENTION

The present invention relates to optical elements comprising fluorochemical surface treatments. The invention further relates to materials such as retroreflective sheetings, pavement markings and beaded projection screens comprising a binder and the surface treated optical elements. The fluorochemical surface treatment is substantially free of perfluoroalkyl groups having more than four carbon atoms. Preferably, the surface treatment is a polyfluoropolyether-based compound comprising at least one polar group or polar group-containing organic radical.

BACKGROUND OF THE INVENTION

Beaded projection display screens, retroreflective sheeting used in the manufacture of roadway signs, and retroreflective paints typically include optical elements adhered through the use of a binder. In the case of beaded projection display materials, the optical elements are microscopic glass beads that act as lenses to collect projected light from the rear of the screen and focus it to relatively small spots, near the surfaces of the microspheres. The foci are approximately in the areas where the optical elements contact a front support layer. In other retroreflective materials, the optical elements act as lenses which focus the light onto a reflector (metal mirror of diffusely reflecting pigment) and once the light has been reflected off the reflector the microspheres again act as lenses to resend the light back toward the incoming light source. In order to contribute the desired retroreflective property, however, it is important that a layer of glass microspheres be present on the surface of the binder layer.

As discussed in U.S. Pat. No. 3,222,204, ordinary glass beads tend to sink into the uncured liquid binder layer. In instances wherein the individual beads are not entirely submerged, the optical properties of the bead can also be impaired by the binder wetting out the bead surface and spreading on the exposed bead surface. To address this problem, U.S. Pat. No. 3,222,204 teaches coating the glass beads with a thin surface coating of an oleophobic fluorocarbon sizing agent. At column 5, lines 61–75, this reference states that, "Aqueous treating solutions of fluorocarbon chromium coordination complexes are preferred and are described in U.S. Pat. No. 2,662,835 (Dec. 15, 1953) and U.S. Pat. No. 2,809,990 (Oct. 15, 1957) and U.S. Pat. No. 2,934,450 (Apr. 26, 1960). The complex may be made by reacting chromyl chloride with a fluorocarbon monocarboxylic acid (having a highly fluorinated terminal chain or tail containing 4 to 10 carbon atoms) in an isopropanol vehicle that serves as both a solvent and reducing agent, the chromium to acid mole ratio being in the range of 2:1 to 5:1. The resultant green-colored isopropanol solution of the complex is diluted with water at the time of use. The fluorocarbon acid preferably has 6 to 8 fully fluorinated (perfluorinated) carbon atoms in the terminal fluorocarbon chain or tail." Specific working examples include chromium coordination complexes of perfluorooctanoic acid and N-ethyl-N-perfluorooctanesulfonyl glycine.

U.S. Pat. No. 4,713,295 teaches coating glass beads with a mixture of substances. The mixture comprises a first substance which if used alone would tend to make the beads hydrophobic while leaving them oleophilic and a second substance which if used alone would tend to make the beads both hydrophobic and oleophobic. "For the best results, it is preferred to use a second substance which is an anionic fluorocarbon compound, and optimally, said second substance is a fluoro-alkyl-sulphonate, for example a fluoro-alkyl-sulphonate in which the alkyl has a long chain (C14 to C18)." (See Column 4, lines 8–13). The exemplified hydrophobic and oleophobic substance is a potassium fluoroalkyl-sulphonate (for example FC129 from 3M). (See column 5, lines 50–52) FC129 is a potassium fluoroctyl sulphonyl-containing compound.

SUMMARY OF THE INVENTION

The fluorocarbon surface treatment of the present invention is substantially free of perfluoroalkyl groups having more than 4 carbon atoms. The present inventors have identified various fluorocarbon derivatives that lack the previously preferred 6 to 8 carbon and longer fully fluorinated tail. Although the terminal fluorocarbon tail is considerably shorter, or absent, the surface treatments of the present invention are surprisingly effective in obtaining the desired floatation properties combined with the desired adhesion with the binder.

In one embodiment, the present invention is an optical element having a surface treatment comprising a polyfluoropolyether compound having at least one polar group or polar group-containing organic radical. The polyfluoropolyether compound has the general formula $R_f$—$[X]_y$ wherein $R_f$ is a monovalent or divalent polyfluoropolyether group, X is a polar group or polar group-containing organic radical, and y ranges from 1 to 2. $R_f$ comprises one or more repeating units selected from the group comprising —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, —$(CF_2CF(Z)O)$—, and combinations thereof; wherein the average n value ranges from 1 to 4 and Z is a perfluoroalkyl group, an oxygen-substituted perfluoroalkyl group, a perfluoroalkoxy group, or an oxygen-substituted perfluoroalkoxy group having 1 to about 4 carbon atoms and 1 to about 4 oxygen atoms. The polar group or polar group-containing organic radical, X, is preferably selected from the group comprising carboxylic acid, sulfonic acid, phosphonic acid, carboxylate salt, sulfonate, phosphonate, phosphate esters, ammonium salts, amine, amide, alkyl amide, alkyl aryl amide, imide, sulfonamide, hydroxymethyl, thiol, ester, silane, polyoxyalkyene, organic radicals substituted with one or more of such polar groups, and mixtures thereof.

Preferred polyfluoropolyether surface treatments have the general formulas X—$(CF_2O(CF_2O)_m(C_2F_4O)_pCF_2)$—X, $C_3F_7O(CF(CF_3)CF_2O)_pCF(CF_2)$—X, and X—$CF_2O(C_2F_4O)_mCF_2$—X; wherein m and p each range from 0 to 50 with the proviso that m and p are not both 0 and X is a polar group or polar group-containing organic radical comprising $CONH(CH_2)_3Si(OMe)_3$, CONH(R) wherein R is an alkyl radical having 1 to 8 carbon atoms, $CONHCH_2CH_2Ph$, $CO_2NH_4$, $CH_2NH_2$, $CO_2H$, $CH_2OH$, $CO_2CH_3$ and combinations thereof. Further, the polyfluoropolyether compounds having the general formula X—$(CF_2O(CF_2O)_m(C_2F_4O)_pCF_2)$—X wherein X is $CONH(CH_2)_3Si(OMe)_3$; $CO_2H$, $CO_2NH_4$ and mixtures thereof; and $(C_3F_7O(CF(CF_3)CF_2O)_p(CF(CF_3)$—X wherein X is $CO_2H$, $CO_2NH_4$, and mixtures thereof; wherein m and p each range from 0 to 50 with the proviso that m and p are not both 0, have demonstrated 100% float at loading levels of about 100 ppm and less.

The number average (Mn) molecular weight of the polyfluoropolyether compound preferably ranges from about 400 to about 10,000 g/mole. Mn is preferably greater than about 1000 g/mole and more preferably greater than about 2000 g/mole. Mn is preferably less than about 8,000 g/mole.

In another embodiment, the present invention is an optical element having a surface treatment comprising a fluorochemical compound having the general formula $(C_nF_{2n+1})$—X wherein n ranges from 1 to 3 and X is a polar group or polar group-containing organic radical.

In another embodiment, the present invention is an optical element having a surface treatment comprising a fluorochemical compound having the general formula $(C_nF_{2n+1})$—X wherein n ranges from 1 to 4, X is a polar group or polar group-containing organic radical and the surface treatment is free of heavy metals and transition metals.

In embodiments wherein the surface treatment has the general formula $(C_nF_{2n+1})$—X, X is preferably selected from the group comprising sulfonic acids and salts thereof; sulfonamides, sulfonimides and salts thereof; amides, silanes, and mixtures of such surface treatments.

The surface treated optical elements of the invention preferably exhibit a percent float in heptane of at least about 90%.

In another embodiment the present invention is an optical element having a surface treatment comprising a fluorochemical compound at a concentration of less than about 100 ppm based on the weight of the optical elements wherein the percent float in heptane is at least about 90%.

In another aspect, the present invention is a method of coating an optical element comprising providing an aqueous surface treatment comprising at least one fluorocarbon compound wherein said compound is free of perfluoroalkyl groups having more than four carbon atoms, coating said composition on optical elements, and drying said composition. The aqueous composition preferably comprises no more than 30 wt-% of a cosolvent with respect to the total weight of the solution.

The invention further relates to reflective articles such as pavement markings, reflective sheeting, and projection screens comprising a binder and the surface treated optical elements of the invention. The optical elements are embedded in the binder surface at a depth of about 40 to 60 percent of their diameters.

DETAILED DESCRIPTION OF THE INVENTION

The present invention relates to optical elements such as glass beads coated with a fluorocarbon surface treatment. The terminology "optical element" refers to a material having a particle size ranging from about 25 to 1000 microns and having a refractive index ranging from about 1.5 to about 2.3 and higher. "Surface treatment" refers to the presence of a fluorochemical comprising one or more $C_1$ to $C_4$ fluoroalkyl and/or one or more $C_1$ to $C_4$ fluoroalkylene fragments on the surface of the optical elements. The presence of such can be detected by means of x-ray photoelectron spectroscopy (XPS) or time of flight secondary ion mass spectroscopy.

The optical elements have at least one dimension that is no larger than 2 millimeters and preferably no larger than 250 microns. The optical elements may be in the form of any shape such as granules, flakes and fibers. However, spheroidal glass elements, denoted as "glass beads", "beads" and "microspheres" hereinafter are preferred for materials such as retroreflective articles (e.g. retroreflective sheetings, pavement markings and beaded projection screens).

During the manufacture of retroreflective materials, optical elements are fixed in place by means of a liquid binder. Optical elements have a density or specific gravity several times that of the liquid binder, causing the optical elements to sink into the liquid binder layer, rather than float on the surface.

Preferred properties of optical elements will be described herein with respect to glass beads. Ordinary glass beads typically have a density of about 2.5 and a refractive index of about 1.5. "High index" beads refers to beads having a density of about 3.5 and a refractive index of about 1.9, whereas "super high index" typically refers to beads having a density of about 5 and a refractive index of about 2.3 or higher. The diameter of the glass beads typically ranges from a few microns to approximately 2500 microns and is preferably from about 25 to 1000 microns.

In addition to having the desired particle size and refractive index, the glass beads are typically transparent. The term transparent means that when viewed under an optical microscope (e.g., at 100×) the microspheres have the property of transmitting rays of visible light so that bodies beneath the microspheres, such as bodies of the same nature as the microspheres can be clearly seen through the microspheres, when both are immersed in oil of approximately the same refractive index as the microspheres. The outline, periphery or edges of bodies beneath the microspheres are clearly discernible. Although the oil should have a refractive index approximating that of the microspheres, it should not be so close that the microspheres seem to disappear as would be the case for a perfect match.

The optical elements may comprise microspheres that are ceramic. In general, ceramic microsphere optical elements are comprised of metal oxides that are substantially colorless. Suitable metal oxides include $Al_2O_3$, $SiO_2$, $ThO_2$, $SnO_2$, $TiO_2$, $Y_2O_3$ and $ZrO_2$ with the oxides of zirconium, silicon, and titanium being preferred. The ceramic microspheres can exhibit a range of properties, depending on the kind and amounts of the various metal oxides employed as well as the method of manufacture. Preferred, however, are dense microspheres having substantially no open porosity that have an average hardness greater than sand.

Additional information concerning the desired properties for various end-uses and methods of manufacture of microspheres (e.g. sol-gel process), can be found in U.S. Pat. Nos. 3,493,403; 3,709,706 and 4,564,556; incorporated herein by reference. Glass beads suitable for use as optical elements in the invention are also commercially available from Flex-O-Lite Corporation, Fenton, Mo. and Nippon Electric Glass, Osaka, Japan.

The optical elements of the invention are coated with a surface treatment that alters the floatation properties of the optical element in the liquid binder. "Float" and derivations thereof, described in the context of glass beads, refers to the beads assuming a position wherein slightly more than half of each bead is submerged. The liquid binder preferably contacts the embedded beads only up to 5 to 30° above their equators. The floatability of the glass beads can be affected to some extent by the particle size, particle size distribution, surface chemistry and chemical make-up of the particular glass beads as well as the chemical make-up, density, and viscosity of the binder. In general, however, only about 10% or less of the glass beads tend to float in heptane test liquid in the absence of an effective surface treatment.

The position that the glass beads attain relative to the undisturbed binder due to the surface treatment assists the anchoring of the beads in the ultimate dried or solidified binder coating. The glass beads are preferably embedded to about 40–70%, and more preferably to about 40–60% of their diameters. The beads are adequately exposed providing a sphere-lens having a large optical aperture relative to its size. During the drying or solidification of the binder, there is some shrinkage of the binder film. However, the beads remain bonded with the centers of the floated beads being approximately equidistant from the underlying back surface of the binder layer or the top surface of the base.

In addition to the improvement in floatation of the optical elements, it is also important that the surface treatment does not adversely affect the adhesion of the optical elements with the liquid binder. The adhesion can be evaluated in several ways and will be described herein with respect to a preferred optical element, glass beads. The initial adhesion can subjectively determined by estimating the depth to which the embedded glass beads have sunk into the binder after curing. The glass beads are preferably embedded to a depth of about 40–70%, and more preferably to about 40–60% of their diameters. Another way of evaluating adhesion is accelerated aging evaluations. A piece of cured glass bead-embedded binder is conditioned in boiling water for 24 hours. After conditioning, the glass beads are preferably embedded to the same extent as prior to conditioning and the individual glass beads are difficult to remove with a dissection probe. Yet another way to evaluate the effect of the binder on adhesion is comparative tensile testing. A uniform slurry of binder and untreated glass beads at a ratio of about 1 to 3 is drawn down into a film having a thickness of about 0.4 mm. A second slurry of binder and surface treated glass beads employing the same ratio of ingredients and film thickness is prepared. After the samples are fully cured, the samples are conditioned for 24 hours in water at ambient temperature. Tensile testing is conducted with a 1" wide sample employing a 2" gap at a rate of 0.5 inches/minute. The stress at break of the sample comprising the surface treated beads is about the same as or preferably greater than the control sample, comprising untreated beads ($\geq$about 90% of the standard deviation of the average value). Any one of the previously described methods is typically sufficient to determine whether the surface treatment adversely affects the adhesion of the glass beads with the liquid binder. Preferably, however, all three of the evaluations are conducted.

The optical elements are coated with a fluorochemical compound having at least one fluoroalkyl and/or fluoroalkylene linkage having 1 to 4 carbon atoms and at least one polar group or polar group-containing organic radical. The fluorochemical surface treatment is substantially free of relatively long chain perfluoroalkyl groups, having 6 or more carbon atoms. "Substantially free" refers to at least about 90 wt-% of the surface treatment comprising $C_1$ to $C_4$ fluoroalkyl and/or $C_1$ to $C_4$ fluoroalkylene segments. Preferably, less than about 1 wt-% of the fluoroalkyl and fluoroalkylene segments contain more than 4 carbon atoms. Most preferably, only trace impurities of fluoroalkyl and fluoroalkylene segments containing more than 4 carbon atoms are present.

The fluorochemical surface treatment is preferably a polyfluoropolyether compound having at least one polar group or polar group-containing organic radical. The polyfluoropolyether compound has the general formula $R_f$—[X]y wherein $R_f$ is a monovalent or divalent polyfluoropolyether group, X is a polar group or polar group-containing organic radical and y ranges from 1 to 2.

The polyfluoropolyether group ($R_f$) can include linear, branched, and/or cyclic structures, that may be saturated or unsaturated, and substituted with one or more oxygen atoms. The polyfluoropolyether group is preferably a perfluorinated group (i.e., all C—H bonds are replaced by C—F bonds). More preferably, $R_f$ includes one or more perfluorinated repeating units comprising —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, —$(CF_2CF(Z)O)$—, and combinations thereof, wherein the average value for n ranges from 1 to 4. In these repeating units, Z is a perfluoroalkyl group, an oxygen-substituted perfluoroalkyl group, a perfluoroalkoxy group, or an oxygen-substituted perfluoroalkoxy group, all of which can be linear, branched, or cyclic, that may be saturated or unsaturated, and substituted with one or more oxygen atoms. The pendant groups Z preferably have about 1 to about 4 carbon atoms and 0 to about 4 oxygen atoms with the proviso that each perfluoroalkylene linkage has 4 or fewer contiguous carbon atoms. Examples of polyfluoropolyethers containing polymeric moieties made of these repeating units are disclosed in U.S. Pat. No. 5,306,758 (Pellerite).

For the monovalent polyfluoropolyether group, the terminal groups can be $(C_nF_{2n+1})$—, $(C_nF_{2n+1}O)$—, $(Y'C_nF_{2n}O)$—, or $(Y'C_nF_{2n+1}O)$— wherein Y' is H, Cl, or Br, for example. Preferably, these terminal groups are perfluorinated. In these repeating units or terminal groups, the average value for n is 1 or more, preferably about 1 to about 4 and more preferably about 1 to about 3. A preferred approximate average structure for a monovalent polyfluoropolyether group is $C_3F_7O(CF(CF_3)CF_2O)_pCF(CF_3)$— wherein an average value for p is 1 to about 50. As synthesized, these compounds typically include a mixture of oligomers. The approximate average structure is the approximate average of the mixture of oligomers.

Preferred approximate average structures for divalent polyfluoropolyether groups include —$CF_2O(CF_2O)_m(C_2F_4O)_pCF_2$—, —$CF(CF_3)(OCF_2CF(CF_3))_mO(C_nF_{2n})O(CF(CF_3)CF_2O)_pCF(CF_3)$— wherein the value for n ranges from 2 to 4, —$CF_2O(C_2F_4O)_pCF_2$—, and —$(CF_2)_3O(C_4F_8O)_p(CF_2)_3$—, wherein an average value for m is 0 to about 50 and an average value for p is 0 to about 50, with the proviso that both m and p cannot be 0 in the same group. Of these, particularly preferred approximate average structures are —$CF_2O(CF_2O)_m(C_2F_4O)_pCF_2$— and —$CF_2O(C_2F_4O)_pCF_2$—.

A wide variety of polar groups or polar group-containing organic radicals, X, are suitable provided such functional end-group(s) serve an intended purpose of binding the surface treatment to the optical elements and not adversely affecting the adhesion between the binder and the optical elements. Additionally, since the perfluoro tail is hydrophobic, the polar group or polar group-containing organic radical also permits the making of dilute emulsions, solutions, and dispersions for treating the optical elements. The polar group or polar group containing radical may be anionic, nonionic, cationic, or amphoteric. In general, the more commonly employed polar groups or polar group-containing organic radicals for aqueous delivery of the treatment solution include organic acids, particularly carboxylic acid, sulfonic acid and phosphonic acid; carboxylate salts, sulfonates, phosphonates, phosphate esters, ammonium salts, amines, amides, alkyl amides, alkyl aryl amides, imides, sulfonamides, hydroxymethyl, thiols, esters, silanes, and polyoxyalkyenes, as well as other organic radicals such as alkylene or arylene substituted with one or more of such polar groups. The polyfluoropolyether compound may have any one of these polar groups or polar group-containing organic radicals or any combination thereof. For enhanced water solubility and ease of processing, the polyfluoropolyether based surface treatment having an acid group is preferably converted to the corresponding salt by neutralization with an appropriate base for embodiments wherein the molecular weight (Mn) is greater than about 1000 g/mole. Other suitable functional groups are known from U.S. Pat. No. 3,810,874 issued May 14, 1974, incorporated herein by reference.

The number of repeat units in the polyfluoropolyether group ($R_f$) combined with the molecular weight of the polar organic group is sufficient to form a compound having a number average molecular weight (Mn) ranging from about 200 g/mole to about 20,000 g/mole. Preferably, Mn is at least about 400 g/mole and less than about 15,000 g/mole, more preferably less than about 10,000 g/mole, and most preferably about 8,000 g/mole or less. Further, the number average molecular weight of the polyfluoropolyether compound is preferably greater than about 1,000 g/mole and more preferably greater than about 2,000 g/mole. It is surprising that oligomeric species several times larger in molecular weight than the previously preferred perfluorooctyl based compounds can effectively be employed as a surface treatment without compromising adhesion of the optical elements to the binder.

Preferred surface treatments include those polyfluoropolyether based compounds having the general formulas X—$(CF_2O(CF_2O)_m(C_2F_4O)_pCF_2)$—X, $C_3F_7O(CF(CF_3)CF_2O)_pCF(CF_3)$—X, and X—$CF_2O(C_2F_4O)_pCF_2X$; wherein m and p each range from 0 to 50 with the proviso that m and p are not both 0 and X is one or more polar groups or polar group-containing organic radicals comprising $CONH(CH_2)_3Si(OMe)_3$, CONH(R) wherein R is an alkyl radical having 1 to 8 carbon atoms, $CONHCH_2CH_2Ph$, $CO_2NH_4$, $CH_2NH_2$, $CO_2H$, $CH_2H$ and $CO_2CH_3$. In particular, the compounds having the general formula X—$(CF_2O(CF_2O)_m(C_2F_4O)_pCF_2)$—X wherein X is $CONH(CH_2)_3Si(OMe)_3$; $CO_2H$, $CO_2NH_4$ and mixtures thereof; and $(C_3F_7O(CF(CF_3)CF_2O)_n(CF(CF_3)$—X wherein X is $CO_2H$, $CO_2NH_4$ and mixtures thereof; have demonstrated 100% float at relatively low concentrations, ranging from about 50 ppm to about 100 ppm based on the weight of the optical elements.

The polyfluoropolyether compound may be prepared with known techniques.

A preferred polyfluoropolyether based surface treatment is poly(hexafluoropropylene oxide) having a carboxylic acid group located on one chain terminus, commercially available from Dupont, Wilmington, Del. under the trade designation "Krytox". "Krytox" 157 FS is available in three relatively broad molecular weight ranges, 2500 g/mole (FSL), 3500–4000 g/mole (FSM) and 7000–7500 g/mole (FSH), respectively for the low, medium and high molecular weights. The low and medium molecular weight grades are preferred for aqueous delivery of the surface treatment. Other suitable polyfluoropolyether compounds include those under the trade designation "Fomblin" Z-DIAC, "Fluorolink" C and "Fluorolink" 7004, commercially available from Ausimont USA, Thorofare, N.J.

Although polyfluoropolyether based compounds are preferred, other fluorochemical compounds bearing short chain perfluororalkyl segments are also suitable for use as a surface treatment for optical elements. Such fluorochemical compounds have the general formula $(C_nF_{2n+1})$—[X] wherein n ranges from 1 to 4 and X is a polar group or polar group-containing organic radical. Preferably, n ranges from 2 to 4 and more preferably n ranges from 3 to 4. Although perfluorobutyric acid does induce the desired floatation in heptane, the use of such and similar derivatives is typically avoided in view of the difficulty in handling such chemicals. The polar group or polar group-containing organic radical may be any of the polar groups or polar group-containing organic radicals previously described for the polyfluoropolyether based surface treatment or a mixture of such surface treatments. Preferred, however, are fluorochemical derivatives having polar groups or polar group-containing organic radicals that are substantially free of heavy metals and transition metals (trace impurities only). Representative surface treatments include those having polar groups or polar group-containing organic radicals such as sulfonic acids and salts thereof (e.g. $C_4F_9SO_3H$, $C_4F_9SO_3Li$, $C_4F_9SO_3K$); sulfonamides sulfonimides and salts thereof (e.g. $(C_4F_9SO_2)_2NH$, $(C_4F_9SO_2)_2NK$; and silanes (e.g. $(CF_3)_2CFO(CH_2)_3SiCl_3$). Such fluorochemical derivatives are known in the art and can be prepared with known techniques. In general, the best results were obtained with compounds containing heptafluoropropyl or nonafluorobutyl groups. Further, the acids tend to exhibit higher percent float on a more consistent basis than their corresponding salts.

The surface treatment comprises any one or any mixture thereof of the previously described compounds wherein the compound or mixture of compounds is substantially free of perfluororalkyl groups having 6 or more carbon atoms. The surface treatment may be a single polyfluoropolyether based compound, a single fluoroalkyl based compound having 1 to 4 carbon atoms, a mixture of two or more polyfluoropolyether compounds, a mixture of two or more fluoroalkyl based compounds, each having 1 to 4 carbon atoms; as well as mixtures of one or more polyfluoropolyether based compounds with one or more fluoroalkyl based compounds, each having 1 to 4 carbon atoms. Further, each individual compound has at least one polar group or polar group-containing organic radical.

The surface treatment is present on the optical elements in an amount sufficient such that greater than about 50% of the optical elements float in heptane. Preferably, the surface treatment improves the floatability such that greater than about 80% of the optical elements float in heptane and more preferably about 90–100% of the optical elements float in heptane.

The amount of fluorochemical derivative employed for coating the optical elements typically ranges from about 5 ppm to about 1000 ppm with respect to the weight of the optical elements. A preferred fluorochemical compound is one that contributes the desired floatation at minimum concentrations. The amount of fluorochemical derivative is usually about 600 ppm or less, preferably about 300 ppm or less, more preferably about 150 ppm, even more preferably about 100 ppm, and most preferably about 50 ppm or less. Typically, the overall coating thickness of the surface treatment of the present invention is greater than about 15 Angstroms, preferably, greater than about 20 Angstroms, and more preferably, greater than about 50 Angstroms. Thicker coatings can be obtained if desired, although it is preferred that the coating thickness be no greater than about 500 Angstroms, more preferably, no greater than about 300 Angstroms, and most preferably, no greater than about 150 Angstroms thick. Excessive concentrations of surface treatment can result in agglomeration of the optical elements. Such limits can be determined by routine experimentation and in some instances the agglomeration can be reduced by the use of flow control agents.

The fluorochemical compositions described herein for use as surface treatment for optical elements are typically liquids. The surface treatments are combined with various solvents to form emulsion(s), solution(s) or dispersion(s). The emulsion(s), solution(s), and dispersion(s) are then further diluted in order to deliver the desired concentration. It is assumed that negligible amounts of the diluted surface treatment are lost and substantially all of the surface treatment present in the emulsion, solution or dispersion is deposited on the optical elements. Hence, the concentration (ppm) based on the weight of the optical elements being coated with the emulsion, solution, or dispersion is approximately equal to the amount retained on the optical elements upon evaporation of the solvent. Although aqueous emulsions, solutions, and dispersions are preferred, up to about 50% of a cosolvent such as methanol, isopropanol, or methyl perfluorobutyl ether may be added.

Preferably, the aqueous emulsions, solutions, and dispersions comprise less than about 30% cosolvent, more preferably less than about 10% cosolvent, and most preferably the aqueous emulsions, solutions, and dispersions are substantially free of cosolvent. The aqueous surface treatment is coated on the optical elements typically by combining the optical elements with the minimum volume of aqueous surface treatment to uniformly coat the optical elements and then drying the coated elements. Although aqueous delivery is preferred, the surface treatment could also be applied from 100% organic solvent as well as by other techniques such as vapor deposition.

In addition to the surface treatment of the invention, the optical elements may comprise one or more additional surface treatments such as adhesion promoters and flow control agents that reduce particle agglomeration. Various silanes such as 3-aminopropyltriethoxysilane are commonly employed as adhesion promoters, whereas methacrylate chromic chloride, commercially available from Zaclon Inc, Cleveland, Ohio under the trade designation "Volan" is a typical flow control agent.

The surface treated optical elements of the invention can be employed for producing a variety of reflective products or articles such as pavement markings, retroreflective sheeting, and beaded projection screens. Such products share the common feature of comprising a liquid binder layer and embedding a multitude of optical elements into the binder surface followed by solidifying the binder to retain the optical elements in place. In the pavement markings, retroreflective sheeting, and beaded projection screens of the invention, at least a portion of the optical elements will comprise the surface treated optical elements of the invention. Typically, the majority of, and preferably substantially all, the optical elements employed in the manufacture of the reflective products will comprise the surface treated optical elements of the invention.

Various known binder materials may be employed including various one and two-part curable binders, as well as thermoplastic binders wherein the binder attains a liquid state via heating until molten. Common binder materials include polyacrylates, methacrylates, polyolefins, polyurethanes, polyepoxide resins, phenolic resins, and polyesters. For reflective paints the binder may comprise reflective pigment. For reflective sheeting, however, the binder is typically transparent. Transparent binders are applied to a reflective base or may be applied to a release-coated support, from which after solidification of the binder, the beaded film is stripped and may subsequently be applied to a reflective base or be given a reflective coating or plating.

There are several types of retroreflective articles in which the surface treated optical elements may be used such as exposed lens (e.g. U.S. Pat. Nos. 2,326,634 and 2,354,018), embedded lens (e.g. U.S. Pat. No. 2,407,680), and encapsulated lens (e.g. U.S. Pat. No. 4,025,159) retroreflective sheeting. Retroreflective articles can be prepared by known methods including a method comprising the steps of: (i) forming a top coat on a release coated web (e.g. coating a solution of hydroxy-functional acrylic polyol and aliphatic polyfunctional isocyanate onto a release-coated paper web and then curing by conveying the coating through an oven at about 150° C. for about 10 minutes); (ii) coating the exposed surface of the top coat with a liquid binder (e.g. coating a solution comprising an oil-free synthetic polyester resin and a butylated melamine resin); (iii) drying the binder to form an uncured tacky bead-bond layer; (iv) cascade-coating onto the bead-bond layer a plurality of glass microspheres forming a monolayer of embedded glass microspheres; (v) curing the bead-containing bead-bond layer to a non-tacky state (e.g. by heating to 150° C.); forming a space coat layer over the bead-containing bead-bond layer (e.g. coating a 25% solids solution comprised of a polyvinylbutyral resin and a butylated melamine resin in a solvent and curing at 170° C. for about 10 minutes); (vi) applying a reflective layer over the space coat layer (e.g. vapor deposition of aluminum metal at a thickness of about 100 nm); and stripping away the release-coated web. An adhesive layer is typically applied to the reflective layer (e.g. by coating a 0.025 mm thick layer of an aggressive acrylic pressure-sensitive adhesive onto a silicone-treated release liner and pressing the adhesive against the reflective layer).

The surface treated optical elements are also useful in pavement marking materials. The optical elements can be incorporated into coating compositions that generally comprise a film-forming material having a multiplicity of optical elements dispersed therein. The surface treated optical elements may also be used in drop-on applications for such purposes as highway lane striping in which the optical elements are simply dropped onto wet paint or hot thermoplastic and adhered thereto.

One typical pavement marking sheet is described in U.S. Pat. No. 4,248,932. This sheet material is a prefabricated strip adapted to be laid on and secured to pavement for such purposes as lane dividing lines and comprises a base sheet, such as a soft aluminum foil which is conformable to a roadway surface; a top layer (also called the support film or binder film) adhered to one surface of the base sheet and being very flexible and resistant to rupture; and a monolayer of surface treated optical elements such as transparent microsphere lens elements partially embedded in the top layer in a scattered or randomly separated manner. The pavement marking sheet construction may also include an adhesive (e.g., pressure sensitive, heat or solvent activated, or contact adhesive) on the bottom of the base sheet. The base sheet may be made of an elastomer such as acrylonitrile-butadiene polymer, polyurethane, or neoprene rubber. The top layer in which the surface treated microspheres are embedded is typically a polymer such as vinyl polymers, polyurethanes, epoxies, and polyesters. Alternatively, the surface treated microsphere lenses may be completely embedded in a layer of the pavement marking sheet.

Pavement marking sheets may be made by processes known in the art (see e.g. U.S. Pat. No. 4,248,932), one example comprising the steps of: (i) coating onto a base sheet of soft aluminum (50 micrometers thick) a mixture of resins (e.g., epoxy and acrylonitrile butadiene elastomer mixture), pigment ($TiO_2$) and solvent (e.g., methyl ethyl ketone) to form the support film; (ii) dropping onto the wet surface of the support film ingredients a multiplicity of the surface treated optical elements of the invention; and curing the support film at 150° C. for about 10 minutes. A layer of adhesive is then usually coated on the bottom of the base sheet.

Pigments or other coloring agents may be included in the top layer in an amount sufficient to color the sheet material for use as a traffic control marking. Titanium dioxide will typically be used for obtaining a white color; whereas, lead chromate will typically be used to provide a yellow color.

A rear projection screen is a sheet-like optical device having a relatively thin viewing layer that is placed at an image surface of an optical projection apparatus. Rear projection screen displays comprising glass microspheres embedded in an opaque matrix are known from U.S. Pat. No. 2,378,252, for example. Generally, the size of the microspheres is less than about 150 microns. For maximum brightness, the microspheres have an index of refraction of less than about 1.8 and preferably from about 1.45 to about 1.75. A plurality of the surface treated glass microspheres are attached to and are in intimate contact with a major surface of a transparent substrate. Alternatively, a diffusion layer can be formed by coating an optically inhomogeneous material as a separate layer onto the transparent substrate prior to application of the opaque binder and microspheres. Rear projection screens are prepared by i) providing a substrate (e.g. polyester, polycarbonate) having an opaque binder disposed thereon (e.g. acrylate loaded with carbon black to make it opaque); and ii) applying the surface treated glass microspheres under conditions effective to produce microspheres in optical contact with the substrate and embedded in the opaque matrix.

In some useful embodiments of the invention, a specular reflective means is provided by a layer of metal (e.g. aluminum) vapor-deposited on the surface treated microspheres. Another useful specular reflective means is a dielectric reflector which comprises one or more layers of a transparent material behind the microspheres, each layer having a refractive index of about 0.3 higher or lower than that of the adjacent layer or beads and each layer having an optical thickness corresponding to an odd numbered multiple of about ¼ wavelength of light in the visible range. More detail on such dielectric reflectors is found in U.S. Pat. No. 3,700,305.

The invention is further illustrated by the following examples.

Test Methods

1. Heptane Floatation—A single layer of optical elements was spread on a clean inverted pint paint can lid. Heptane was slowly introduced with a syringe or dropper at the edge of the lid until it overflows. The percentage of optical elements floating was estimated visually. In the absence of indicating otherwise, the beads were tested within 24 hours of being coated with the surface treatment.

2. Initial Adhesion—A polyurethane liquid binder having the following components was prepared:

| | |
|---|---|
| 27 parts | Rutile titanium dioxide pigment (commercially available from Dupont, New Johnsonville, TN under the trade designation Tipure R-960") |
| 25 parts | polyester polyol (commercially available from Union Carbide Corp., Danbury, CT under the trade designation "Tone 0301") |
| 50 parts | aliphatic polyisocyanate (commercially available from Bayer Corp., Pittsburgh, PA under the trade designation Desmodur N-100) |

The binder was drawn down on a paper liner at thickness of 0.4 mm. Immediately thereafter, a plurality of the indicated glass beads were cascaded over the binder, maximizing the number of adhered beads per surface area of binder. The bead coated binder was then cured in an oven (100° C. for 30 minutes is typically sufficient for the polyurethane binder). The bead-coated binder film was examined under a microscope. The sample passes when the optical elements are embedded to about 40–70% of their diameters.

3. Accelerated Aging Adhesion—A ¼" by 1" piece of cured bead-coated binder film, prepared for the Initial Adhesion Test, is placed in a flask of boiling water for 24 hours. The aged sample is then inspected under a microscope to determine whether the optical elements remain embedded. The sample passes when the sample appears approximately the same as the initial sample and the beads are difficult to remove with a dissection probe.

4. Coefficient of Retroreflection (RA), in cd/Lux/m$^2$, was measured at an entrance angle of −4.0 degrees and an observation angle of 0.2° according to Procedure B of ASTM Standard E 809-94a. The photometer used for the measurements is described in U.S. Defensive Publication No. T987,003.

In general, the $R_F$—$[X]_Y$ polyfluoropolyethers used in the examples had the following structures:

"Structure A" is X—$CF_2O(CF_2O)_m(C_2F_4O)_pCF_2$—X (<m> and <p>~10–12)

"Structure B" is $C_3F_7O(CF(CF_3)CF_2O)_pCF(CF_3)$—X

"Structure C" is X—$CF_2O(C_2F_4O)_mCF_p$—X

A perfluoropolyether diol having Structure C wherein X=$CH_2OH$, and Mn~1250 was prepared as described in U.S. Pat. No. 5,266,650 (Example 1). A perfluoropolyether diamine having Structure A wherein X=$CH_2NH_2$ was prepared as described in U.S. Pat. No. 3,810,874 (Example 14). The other perfluoropolyether starting compounds employed in the examples were commercially available. The source of these compounds as well as the structure and number average molecular weight is depicted in the following Table I.

TABLE I

| Trade Designation | Supplier, Location | Structure | X | Mn |
|---|---|---|---|---|
| "Fomblin" Z-DEAL | Ausimont USA, Thorofare, NJ | A | $CO_2CH_3$ | ~2000 |
| "Fomblin" Z-DIAC | Ausimont USA, Thorofare, NJ | A | $CO_2H$ | ~2100 |
| "Fluorolink" C | Ausimont USA, Thorofare, NJ | A | $CO_2H$ | ~2200 |
| "Krytox" 157 FSL | Dupont, Wilmington, DE | B | $CO_2H$ | ~2500 |
| "Krytox" 157 FSM | Dupont, Wilmington, DE | B | $CO_2H$ | ~3500–4000 |
| "Krytox" 157 FSH | Dupont, Wilmington, DE | B | $CO_2H$ | ~7000–7500 |
| "Fluorolink" 7004 | Ausimont USA, Thorofare, NJ | * | $CO_2H$ | ~700 |

*monofunctional $C_3$ perfluoropolyether, exact structure unknown

Optical Elements

Different types of reflective beads were employed to evaluate the effectiveness of the surface treatment of the invention. Type 1 reflective glass beads had an index of refraction of 2.3 and an average diameter of 71 microns. Type 2 reflective glass beads had 15 an index of refraction of 2.3 and an average diameter of 56 microns. Both the Type 1 and Type 2 beads are representative of optical elements commonly used for reflective sheeting. The Type 1 and Type 2 glass beads had a density of about 4.6 and are composed of barium, titanium and zinc oxides as described in U.S. Pat. No. 3,493,403. Type 3 reflective glass beads, commercially available from Nippon Electric Glass, Osaka, Japan under the trade designation "K-68", had an index of refraction of 2.2. The "K-68" beads are also available having a silane pretreatment (Type 3—pretreated). Type 4, Type 5, and Type 6 reflective glass beads are representative of optical elements commonly employed for reflective paint (e.g., pavement markings). The Type 4 and Type 5 glass beads were obtained from Flex-O-Lite Corporation, Fenton, Mo. Type 4, having the trade designation "831" had an average diameter of 65 microns and an index of refraction of 1.9. Type 5 had an index of refraction of 1.5 and a size gradation that complies with the American Association of State Highway and Transportation Officials designation M 247-81. Type 6 glass beads had an average diameter of 200 microns, an index of refraction of 1.75 and were prepared according to the teaching of U.S. Pat. No. 4,564,556.

For Examples 1–32 and 38–51, the optical elements were surface treated by charging a 25 g sample of the indicated bead type into a round-bottom flask. A sufficient amount (8–10 ml) of the indicated solvent (deionized water, methanol, isopropanol, dichloromethane or HFE 7100-methyl perfluorobutyl ether, obtained from Minnesota Mining & Manufacturing "3M" Company, St. Paul, Minn.) was added to cover and wet out the beads. The perfluoropolyether derivative was then added, as a dilute (usually 1 wt %) solution, in an amount to provide the desired treatment level, 50–600 ppm based on the weight of the reflective beads. Most of the solvent was removed by rotary evaporation. The beads were heated in a forced-air oven at 120° C. for 30 min (for samples treated out of organic solvent) or 2 hr (for samples treated out of water, in which case the rotary evaporation step was omitted.) The dried beads were then tested in the heptane float test as described above.

Examples 1–17 of Table II depict the percent float of Type 1 reflective beads that were surface treated with various perfluoropolyether acid salts solutions employing the solvent indicated in column 2 and the concentration (loading) of perfluoropolyether indicated in column 3. Each of the indicated perfluoropolyether carboxylic acid derivatives were converted to the corresponding salt by first diluting a sample of the perfluoropolyether carboxylic acid (generally 1–2 g) to 10 wt % in methanol in a screw-top vial. For the "Fomblin", "Fluorolink" C., and "Krytox" 157 FS perfluoropolyether acids, the dilution yielded a cloudy, two-phase mixture. The mixture was shaken while a solution of concentrated ammonium hydroxide or 10 wt % potassium hydroxide in water was added dropwise until the mixture clarified, leaving a foamy solution. For "Fomblin" Z-DIAC and "Krytox" 157 FSL, the resulting solutions of ammonium salts were clear. For "Fluorolink" C and "Krytox" 157 FSM, and the potassium salt of "Krytox" 157 FSL, the neutralized salt solutions were slightly hazy. The neutralized ammonium salt mixture of "Krytox" 157 FSH, was hazy and only partially translucent. The mixture did not foam upon shaking and exhibited some phase separation after standing at room temperature overnight. Each solution was then diluted further to 1 wt % with additional methanol prior to application to the reflective beads as surface treatments. Comparative A is a solution of 31.5 wt % N-ethyl-N-perfluorooctanesulfonylglycine chromium complex in isopropanol, prepared as described according to U.S. Pat. No. 2,809,990 (Example 1). The solution was diluted with methanol to 1 wt % solids.

The percent float is reported in Table II. The results demonstrate that 100% bead float can be obtained lower concentrations of perfluoropolyether treatment than with the prior art N-ethyl-N-perfluorooctanesulfonylglycine chromium complex.

TABLE II

% Float of Beads Treated with Perfluoropolyether Carboxylic Acid Salts

| Perfluoropolyether Acid Salt | Solvent | Loading (ppm) | % Float |
|---|---|---|---|
| Ex. 1-"Krytox" 157 FSL $NH_4^+$ | Water | 150 | ~100 |
| Ex. 2-"Krytox" 157 FSL $NH_4^+$ | Water | 100 | ~100 |
| Ex. 3-"Krytox" 157 FSL $NH_4^+$ | Water | 50 | ~100 |
| Ex. 4-"Krytox" 157 FSL $NH_4^+$ | Methanol | 150 | ~100 |
| Ex. 5-"Krytox" 157 FSM $NH_4^+$ | Water | 150 | ~100 |
| Ex. 6-"Krytox" 157 FSM $NH_4^+$ | Methanol | 150 | ~100 |
| Ex. 7-"Krytox" 157 FSH $NH_4^+$ | Water | 150 | ~100 |
| Ex. 8-"Krytox" 157 FSH $NH_4^+$ | Methanol | 150 | ~100 |
| Ex. 9-"Krytox" 157 FSL $K^+$ | Water | 150 | ~100 |
| Ex. 10-"Krytox" 157 FSL $K^+$ | Methanol | 150 | ~100 |
| Ex. 11-"Krytox" 157 FSL $K^+$ | Methanol | 300 | ~100 |
| Ex. 12-"Fomblin" Z-DIAC $NH_4^+$ | Water | 50 | ~100 |
| Ex. 13-"Fomblin" Z-DIAC $NH_4^+$ | Water | 100 | ~100 |
| Ex. 14-"Fomblin" Z-DIAC $NH_4^+$ | Water | 150 | ~100 |
| Ex. 15-"Fomblin" Z-DIAC $NH_4^+$ | Methanol | 150 | ~100 |
| Ex. 16-"Fluorolink" C $NH_4^+$ | Water | 150 | ~100 |
| Ex. 17-"Fluorolink" C $NH_4^+$ | Methanol | 150 | ~100 |
| Comparative A | Water | 50 | ~50 |
| Comparative A | Water | 100 | ~80 |
| Control-No Surface Treatment | Water | 0 | <10 |
| Control-No Surface Treatment | Methanol | 0 | <10 |

A solution of 1 wt % "Fluorolink" 7004 carboxylic acid in methanol was prepared. Type 1 beads were coated in the same manner as previously described. Table III depicts the % float obtained with this acid-terminated perfluoropolyether, employing the solvent indicated in column 1 and the concentration (loading) indicated in column 2.

TABLE III

% Float of Beads Treated with "Fluorolink" 7004 Carboxylic Acid

| Solvent | Loading (ppm) | % Float |
|---|---|---|
| Ex. 18-Methanol | 150 | ~60 |
| Ex. 19-Methanol | 300 | ~100 |
| Ex. 20-Water | 150 | ~100 |
| Control-Water | 0 | <10 |
| Control-Methanol | 0 | <10 |

EXAMPLES 21–23

A perfluoropolyether derivative having Structure A wherein X=$CONH_2$ (Ex. 21) was prepared by bubbling ammonia gas through a sample of "Fomblin" Z-DEAL (Structure A wherein X=$CO_2CH_3$), until infrared analysis indicated complete replacement of ester with amide. Perfluoropolyether derivatives having Structure A wherein X=CONH(n—$C_6H_{13}$) (Ex. 22), Structure A wherein X=CONH$CH_2CH_2$Ph (Ex. 23), and Structure A wherein X=CONH$CH_2CH_2CH_2$Si$(OCH_3)_3$ (Ex. 24), were prepared by titration of "Fomblin" Z-DEAL with, respectively, n-hexylamine, 2-phenylethylamine, and 3-aminopropyltrimethoxysilane. The reaction was monitored by infrared analysis to confirm complete replacement of ester with amide. These derivatives were used without further purification or removal of byproduct methanol. The perfluoropolyether bis(amides) (Ex. 21–23) were dissolved in methanol to make three 1 wt % solutions. Each solution was then used to treat Type 1 reflective beads employing methanol as the solvent, using the procedure described above. The loading level was 150 ppm. All three samples exhibited ~100% bead float in the float test, while a control sample treated with methanol exhibited <10% float.

EXAMPLE 24–31

Each of the perfluoropolyether derivatives depicted in Table IV were diluted in HFE 7100 to make 1 wt % solutions. These solutions were used to treat Type 1 or Type 2 beads in additional HFE 7100 or isopropanol as solvent (per column 3), in the same manner as described above. Comparative Examples B & C are perfluoropolyether oils having Structure B and X=F (no polar group). The Comparative Examples were diluted to 1 wt % in HFE 7100 and in additional HFE 7100 to obtain the desired treatment level. The bead type, solvent type, concentration (loading), and percent float are shown in Table IV as follows. The results demonstrate the importance of the polyfluoropolyether structure having a polar group or polar group-containing organic radical for use in the invention as a surface treatment.

TABLE IV

% Float of Beads Treated with Perfluoropolyether Derivatives

| Perfluoropolyether Derivative | Bead Type | Solvent | Loading (ppm) | % Float |
|---|---|---|---|---|
| Ex. 24-Structure A, X = CONHCH$_2$CH$_2$CH$_2$Si(OCH$_3$)$_3$ | 1 | HFE 7100 | 100 | ~100 |
| Ex. 25-Structure C, X = CH$_2$OH | 1 | HFE 1700 | 150 | ~100 |
| Ex. 26-Structure C, X = CH$_2$OH | 1 | HFE 1700 | 300 | ~100 |
| Ex. 27-"Fomblin" Z-DEAL | 2 | Isopropanol | 600 | ~100 |
| Ex. 28-Structure A, X = CH$_2$NH$_2$ | 2 | Isopropanol | 600 | ~100 |
| Ex. 29-"Krytox" 157 FSL | 2 | Isopropanol | 600 | ~100 |
| Ex. 30-"Krytox" 157 FSM | 2 | Isopropanol | 600 | >90 |
| Ex. 31-"Krytox" 157 FSH | 2 | Isopropanol | 600 | >80 |
| Comparative B-"Krytox" 1514 | 1 | HFE 7100 | 150 | <5% |
| Comparative B-"Krytox" 1514 | 1 | HFE 7100 | 300 | <5% |
| Comparative C-"Krytox" 1645 | 1 | HFE 7100 | 150 | <5% |
| Comparative C-"Krytox" 1645 | 1 | HFE 7100 | 300 | <5% |
| Control (no surface treatment) | 1 | — | 0 | <10 |
| Control (no surface treatment) | 1 | — | 0 | <10 |

EXAMPLE 32

The perfluoropolyether diamine derivative having Structure A wherein X=CH$_2$NH$_2$ was diluted to 1 wt % in methanol in a screw top vial, yielding a hazy, two-phase mixture. The mixture was shaken while adding 1N HCl solution dropwise until the mixture clarified, leaving a clear, foamy solution. The mixture was diluted further with deionized water to obtain a solution of the perfluoropolyether bis (amine hydrochloride) salt in 3:1 (w/w) water:methanol. Appropriate amounts of this 0.25% solution were then added to samples of Type 1 beads to obtain loadings of 100, 300, and 600 ppm. The samples were oven dried as described previously, and tested for % float. The 100 ppm concentration resulted in ~75% float, whereas the 300 and 600 ppm concentrations resulted in ~100% float.

EXAMPLES 33–36

A surface treatment solution was prepared by adding 20 g of "Krytox" 157 FSL to 180 g methanol in a 500 ml Erlenmeyer flask equipped with magnetic stirring. While stirring vigorously, concentrated ammonium hydroxide aqueous solution was added dropwise (about 0.6 g) until the cloudy, two-phase mixture became clear, indicative of a single-phase, homogeneous solution. 1.322g of the homogeneous solution was diluted with 8.68 g of deionized water. Four type of beads were surface treated by hand mixing 50 grams of each bead type with 0.675 ml of the diluted solution. The coated beads were dried at 90° C. in a forced air oven. The percent float was determined and is reported in Table IV as follows.

TABLE V

% Float of Beads Treated with Perfluoropolyether Carboxylic Acid Salts

| Bead Type | % Float |
|---|---|
| Ex. 33-Type 3 | ~100 |
| Ex. 34-Type 3 (pretreated) | ~100 |
| Ex. 35-Type 4 | ~100 |
| Ex. 36-Type 5 | ~100 |

EXAMPLE 37

Aqueous Delivery of Krytox 157FSL Acid Without Cosolvents

An 8 oz screw-top jar was charged with approximately 0.03 g "Krytox" 157 FSL acid and 60 g deionized water. The jar was capped and shaken to yield a cloudy, coarse, unstable emulsion. Type 1 reflective beads (200 g, ~150 ppm perfluoropolyether acid treatment) were added, and the mixture was shaken vigorously to wet out the beads. When the beads were allowed to settle, the supernatant liquid was seen to have clarified. The sample was dried in a forced air oven at 120° C. for 3.5 hr. After cooling, the beads were tested and found to give ~100% float. The beads were retested after storage of the surface treated beads at room temperature for 48 hours. The beads continued to exhibit ~100% float. Table VI depicts other fluorochemical surface treatments that are substantially free of long chain perfluoroalkyl groups. These surface treatments were used to coat Type 1 beads in the manner previously described with the exception that Example 46 employed the Type 2 beads.

TABLE VI

% Float of (C$_n$F$_{2n+1}$)-[X] Fluorochemical Surface Treatments

| Surface Treatment | Solvent | Loading (ppm) | % Float |
|---|---|---|---|
| Sulfonic Acids & Salts | | | |
| Ex. 38-C$_4$F$_9$SO$_3$H | Methanol | 300 | ~100 |
| Ex. 39-C$_4$F$_9$SO$_3$H | Methanol | 150 | ~100 |
| Ex. 40-C$_4$F$_9$SO$_3$H | Water | 150 | ~100 |
| Ex. 41-C$_4$F$_9$SO$_3$Li | Methanol | 300 | ~100 |
| Ex. 42-C$_4$F$_9$SO$_3$Li | Methanol | 150 | ~100 |
| Ex. 43-C$_4$F$_9$SO$_3$Li | Water | 150 | ~90 |
| Sulfonimides & Salts | | | |
| Ex. 44-(C$_4$F$_9$SO$_2$)$_2$NH | Methanol | 300 | ~100 |
| Ex. 45-(C$_4$F$_9$SO$_2$)$_2$NH | Methanol | 150 | ~100 |
| Ex. 46-(C$_4$F$_9$SO$_2$)$_2$NH | Water | 150 | ~100 |
| Ex. 47-(C$_4$F$_9$SO$_2$)$_2$NK | Isopropanol | 600 | >90 |
| Fluorinated Acids | | | |
| Ex. 48-n-C$_3$F$_7$CO$_2$H | Methanol | 300 | >90 |
| Fluoroalkyl Silane | | | |
| Ex. 49-(CF$_3$)$_2$CFO(CH$_2$)$_3$SiCl$_3$ | CH$_2$Cl$_2$ | 150 | ~100 |
| Ex. 50-(CF$_3$)$_2$CFO(CH$_2$)$_3$SiCl$_3$ | CH$_2$Cl$_2$ | 300 | ~100 |
| Ex. 51-(CF$_3$)$_2$CFO(CH$_2$)$_3$SiCl$_3$ | CH$_2$Cl$_2$ | 600 | ~100 |
| Comparative A | Methanol | 300 | ~100 |
| Control-No Treatment | — | — | ~10–20 |

Adhesion testing was conducted on some of the surface treated glass beads. Type 6 glass beads were pretreated with 600 ppm of 3-aminopropyltriethoxysilane commercially available from OSI Specialties, Danbury, Conn. under the trade designation "Silquest A-1100". The "Krytox" 157 FSL $NH_4^+$ surface treatment was prepared as previously described. Ten wt-% solutions of "Fluorolink" C and "Fluorolink" 7004 were prepared with isopropanol and ethanol, respectively. The solutions were further diluted with water to obtain the desired treatment level. Type 6 beads were coated with the surface treatment indicated in column 1 at the treatment level indicated in column 2 in the manner previously described. Table VII depicts the % Float, Initial Adhesion, Accelerated Aging Adhesion, and the Coefficient of Retroreflection (RA).

TABLE VII

| Surface Treatment | Loading (ppm) | % Float | Initial Adhesion (%) | Accelerated Aging (pass/fail) | RA (cd/lux/m²) |
|---|---|---|---|---|---|
| Control* (none) | 0 | 0 | ~95 | ** | .62 |
| Control (none) | 0 | 0 | ~95 | ** | .98 |
| Ex. 52 "Krytox" 157 FSL $NH_4^+$ | 50 | ~95 | ~40 | Pass | 8.47 |
| Ex. 53 "Fluorolink" C | 50 | ~95 | ~40 | Pass | 8.79 |
| Ex. 54 "Fluorolink" 7004 | 50 | ~80 | ~55 | Pass | 8.29 |

*no "Silquest A-1100"
**Could not be determined since the beads were embedded to 95%

What is claimed is:

1. An optical element having a surface treatment comprising a polyfluoropolyether compound having at least one polar group or polar group-containing organic radical.

2. The optical element of claim 1 wherein the polyfluoropolyether compound has the general formula $R_f$—[X]$_y$ wherein $R_f$ is a monovalent or divalent perfluoropolyether group, X is a polar group or polar group-containing organic radical, and y ranges from 1 to 2.

3. The optical element of claim 2 wherein $R_f$ comprises one or more repeating units selected from the group consisting of —($C_nF_{2n}$)—, —($C_nF_{2n}$O)—, —(CF(Z))—, —(CF(Z)O)—, —(CF(Z)$C_nF_{2n}$O)—, —($C_nF_{2n}$CF(Z)O)—, —($CF_2$CF(Z)O)—, and combinations thereof; wherein the average n value ranges from 1 to 4 and Z is a perfluoroalkyl group, an oxygen-substituted perfluoroalkyl group, a perfluoroalkoxy group, or an oxygen-substituted perfluoroalkoxy group having 1 to about 4 carbon atoms and 1 to about 4 oxygen atoms.

4. The optical element of claim 2 wherein X is selected from the group consisting of carboxylic acid, sulfonic acid, phosphonic acid, carboxylate salt, sulfonate, phosphonate, phosphate esters, ammonium salts, amine, amide, alkyl amide, alkyl aryl amide, imide, sulfonamide, hydroxymethyl, thiol, ester, silane, polyoxyalkyene, organic radicals substituted with one or more of said polar groups, and mixtures thereof.

5. The optical element of claim 2 wherein the polyfluoropolyether compound is selected from the group consisting of the general formulas:
   i) X—$CF_2O(CF_2O)_m(C_2F_4O)_pCF_2$—X;
   ii) $C_3F_7O(CF(CF_3)C_2O)_pCF(CF_3)$—X; and
   iii) X—$CF_2O(C_2F_4O)_mCF_2$—X;
wherein m and p each independently range from 0 to 50, with the proviso that m and p are not both 0 and X is a polar group or polar group-containing organic radical selected from the group comprising $CONH(CH_2)_3Si(OMe)_3$, CONH(R) wherein R is an alkyl radical having 1 to 8 carbon atoms, $CONHCH_2CH_2Ph$, $CO_2NH_4$, $CH_2NH_2$, $CO_2H$, $CH_2OH$, $CO_2CH_3$ and combinations thereof.

6. The optical element of claim 2 wherein the polyfluoropolyether compound has the general formula:
   i) X—($CF_2O(CF_2O)_m(C_2F_4O)_pCF_2$)—X wherein X is $CONH(CH_2)_3Si(OMe)_3$; $CO_2H$, $CO_2NH_4$, and mixtures thereof;
   ii) $C_3F_7O(CF(CF_3)CF_2O)_pCF(CF_3)$—X wherein X is $CO_2H$, $CO_2NH_4$ and mixtures thereof;
wherein m ranges from 0 to 50 and p ranges from 0 to 50, with the proviso that m and p are not both 0.

7. The optical element of claim 1 wherein the number average molecular weight of the polyfluoropolyether compound ranges from about 400 to about 10,000 g/mole.

8. The optical element of claim 7 wherein the number average molecular weight of the polyfluoropolyether compound is greater than 1000 g/mole.

9. The optical element of claim 7 wherein the number average molecular weight of the polyfluoropolyether compound is greater than 2000 g/mole.

10. The optical element of claim 7 wherein the number average molecular weight is less than 8,000 g/mole.

11. The optical element of claim 1 wherein the percent float in heptane is at least 90%.

12. The optical element of claim 11 wherein the surface treatment concentration is less than 100 ppm.

13. A pavement marking comprising a liquid binder and the optical elements of claim 1.

14. The pavement marking of claim 13 wherein the optical elements are embedded in the binder at a depth of about 40–70% of their diameters.

15. A reflective sheeting comprising:
   a) a top coat layer having an exposed surface;
   b) a binder layer disposed on the exposed surface of the top coat layer;
   c) the optical elements of claim 1 disposed on the binder layer;
   d) a space coat layer disposed on the binder layer; and
   e) a reflective layer disposed on the space coat layer.

16. The reflective sheeting of claim 15 wherein the optical elements are embedded in the binder at a depth of about 40–70% of their diameters.

17. A rear projection screen comprising a transparent substrate and the optical elements of claim 1 embedded in an opaque binder matrix and wherein said optical elements are in contact with the transparent substrate.

18. The reflective sheeting of claim 17 wherein the optical elements are embedded in the binder at a depth of about 40–70% of their diameters.

* * * * *

UNITED STATES PATENT AND TRADEMARK OFFICE
CERTIFICATE OF CORRECTION

PATENT NO. : 6,632,508 B1
DATED : October 14, 2003
INVENTOR(S) : Pellerite, Mark J.

It is certified that error appears in the above-identified patent and that said Letters Patent is hereby corrected as shown below:

Column 2,
Line 10, "fluoroctyl" should be -- fluorolctyl --.

Column 4,
Line 53, "derivations" should be -- derivatives --.

Column 5,
Line 15, insert -- be -- following "can".
Line 63, "[X]Y" should be -- $[X]_y$ --.

Column 6,
Line 62, "polyoxyalkyenes" should be -- polyoxyalklenes --.

Column 7,
Line 27, "$CF_2X$;" should be -- $CF_2$-X; --.
Line 33, "$CH_2H$" should be -- $CH_2OH$ --.
Line 61, "perfluororalkyl" should be -- perfluoroalkyl --.

Column 8,
Line 14, insert -- , -- following "sulfonamides".
Line 26, "perfluororalkyl" should be -- perfluororalkyl --.

Column 9,
Lines 15-16, should not start a new paragraph.

Column 12,
Line 66, delete "15" following "had".

Column 14,
Line 2, insert -- with -- following "obtained".
Line 66, "(EX." should be -- (Exs. --.

Column 15,
Line 7, "EXAMPLE" should be -- EXAMPLES --.
Lines 31-32, "1700" should be -- 7100 --.

Column 16,
Line 2, "type" should be -- types --.
Lines 33-34, should start a new paragraph with "Table".

UNITED STATES PATENT AND TRADEMARK OFFICE
CERTIFICATE OF CORRECTION

PATENT NO. : 6,632,508 B1
DATED : October 14, 2003
INVENTOR(S) : Pellerite, Mark J.

It is certified that error appears in the above-identified patent and that said Letters Patent is hereby corrected as shown below:

Column 17,
Line 53, "polyoxyalkyene" should be -- polyoxyalkylene --.

Column 18,
Line 28, "clement" should be -- element --.

Signed and Sealed this

Twenty-seventh Day of April, 2004

JON W. DUDAS
*Acting Director of the United States Patent and Trademark Office*